US012638537B2

(12) United States Patent
Montgomery et al.

(10) Patent No.: US 12,638,537 B2
(45) Date of Patent: May 26, 2026

(54) FIRST RESPONDER ELEVATION DETECTION VIA DRONE AND 3-WAY COMMUNICATION TELEMETRY SYSTEM

(71) Applicant: 3M INNOVATIVE PROPERTIES COMPANY, St. Paul, MN (US)

(72) Inventors: Nathan J. Montgomery, Indian Trail, NC (US); Matthew Shannon, Salisbury, NC (US); Richard J. Sabacinski, Charlotte, NC (US); Craig M. Parkulo, Midland, NC (US); Wesley M. Barbee, Oxboro, NC (US); Mike E. Hamerly, Vadnais Heights, MN (US); Elias Wilken-Resman, Minneapolis, MN (US); Ronald D. Jesme, Plymouth, MN (US); Robert A. Sainati, Bloomington, MN (US); Longin J. Kloc, Charlotte, NC (US); Darin K. Thompson, Huntersville, NC (US); Gary T. Silsby, Waxhaw, NC (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 439 days.

(21) Appl. No.: 18/123,178

(22) Filed: Mar. 17, 2023

(65) Prior Publication Data

US 2023/0314544 A1 Oct. 5, 2023

Related U.S. Application Data

(60) Provisional application No. 63/327,131, filed on Apr. 4, 2022.

(51) Int. Cl.
*G01S 1/04* (2006.01)
*H04W 64/00* (2009.01)

(52) U.S. Cl.
CPC ........... *G01S 1/042* (2013.01); *H04W 64/006* (2013.01)

(58) Field of Classification Search
CPC .. G01S 1/042; G01S 2201/04; G01S 2205/06; G01S 5/0249; G01S 5/0231; G01S 17/86; G01S 17/42; G01S 13/46; G01S 13/56; G01S 17/89; G01S 13/878; G01S 2013/468; G01S 7/4815; G01S 19/17;
(Continued)

(56) References Cited

U.S. PATENT DOCUMENTS 10,089,889 B2 10/2018 Patterson et al.
2018/0039262 A1* 2/2018 Fox .......................... H04W 4/02
(Continued)

FOREIGN PATENT DOCUMENTS

EP 3819858 5/2021

*Primary Examiner* — Nimesh Patel
(74) *Attorney, Agent, or Firm* — Katherine M. Scholz

(57) ABSTRACT

A tracker device for a first responder including a radio configured to receive a first radio signal from an emitter, and receive a second radio signal from an unmanned aerial vehicle (UAV). The second radio signal includes at least one data packet including location information associated with the emitter. Processing circuitry in communication with the radio is configured to determine at least one location parameter associated with the emitter based on the first radio signal and the location information of the at least one data packet of the second radio signal.

15 Claims, 6 Drawing Sheets

(58) Field of Classification Search

CPC .......... G01S 17/88; G01S 19/51; G01S 11/06; G01S 15/08; G01S 19/01; G01S 5/0036; G01S 5/0295; G01S 5/08; G01S 7/003; G01S 13/74; G01S 13/887; G01S 15/04; G01S 15/06; G01S 19/42; G01S 2205/001; G01S 5/0027; G01S 7/417; H04W 64/006; H04W 72/23; H04W 24/08; H04W 92/18; H04W 72/21; H04W 4/38; H04W 60/04; H04W 88/02; H04W 4/08; H04W 28/16; H04W 84/12; H04W 52/0225; H04W 64/003; H04W 92/10; H04W 4/021; H04W 12/45; H04W 12/63; H04W 4/025; H04W 40/20; H04W 74/02; H04W 84/047; H04W 12/104; H04W 36/322; H04W 4/027; H04W 52/0251; H04W 4/029; H04W 4/90; H04W 4/80; H04W 8/005; H04W 84/005; H04W 84/042; H04W 64/00; H04W 4/02; H04W 4/023; H04W 4/70; H04W 4/024; H04B 17/318; H04B 17/309; H04B 17/27; H04B 17/20; H04B 17/40; H04B 7/18504; H04B 7/15; G06N 20/00; G06N 3/088; G06N 3/045; G06N 3/02; G06N 3/042; G06N 20/20; G06N 3/08; G06N 3/008; G06N 3/0464; G06N 3/082; B64U 2101/30; B64U 2201/20; B64U 2201/10; B64U 10/13; B64U 2101/57; B64U 2101/55; B64U 2101/00; B64U 2101/56; B64U 2201/104; B64U 10/60; B64U 2101/58; B64U 2101/31; B64U 80/86; B64U 2101/20; B64U 2101/24; B64U 2201/202; B64U 70/93; B64U 20/80; B64U 50/38; B64U 10/20; B64U 10/50; B64U 10/30; B64U 2201/00; B64C 39/024; B64C 39/02; B64C 19/00; B63C 2009/0017; B63C 9/0005; B63C 9/00; G08G 5/57; G08G 1/096791; G08G 1/205; G08G 1/0175; G08G 5/22; G08G 1/166; G08B 17/00; G08B 19/00; G08B 7/062; G08B 7/066; G08B 25/10; G08B 27/00; G08B 25/016; G08B 21/02; G08B 21/0272; G08B 17/10; G08B 21/22; G08B 27/001; G08B 25/009; G08B 23/00; G06V 20/17; G06V 10/82; G06V 20/13; G06V 20/58; G06V 20/05

See application file for complete search history.

(56) References Cited

U.S. PATENT DOCUMENTS

| | | | | |
|---|---|---|---|---|
| 2019/0297462 A1* | 9/2019 | Aljadeff | ................. | G01S 13/88 |
| 2020/0293040 A1* | 9/2020 | Chakraborty | ........ | G05D 1/0044 |
| 2020/0309895 A1* | 10/2020 | Wu | ....................... | G01S 13/878 |
| 2020/0314627 A1* | 10/2020 | Fischer | ................. | H04W 8/005 |
| 2021/0269149 A1* | 9/2021 | Culver | .................. | B64U 10/60 |
| 2023/0164734 A1* | 5/2023 | Gao | ..................... | H04W 64/00 |
| | | | | 455/456.1 |

* cited by examiner

FIRST RESPONDER ELEVATION DETECTION VIA DRONE AND 3-WAY COMMUNICATION TELEMETRY SYSTEM

CROSS REFERENCE TO RELATED APPLICATIONS

This application claims priority from U.S. Provisional Application Ser. No. 63/327,131, filed Apr. 4, 2022, the disclosure of which is incorporated by reference in its/their entirety herein.

TECHNICAL FIELD

This disclosure relates to location detection, and in particular to an apparatus and system, and related methods of use thereof, for locating a downed first responder in a multi-story building.

INTRODUCTION

A first responder, such as a member of a firefighting team, may be missing or trapped in a burning structure, such as a multi-story building, and may be unable to respond to radio calls, e.g., because the first responder is injured or disoriented. Further, smoke and debris make visual contact difficult to impossible.

Known solutions may provide a distress alarm system designed to help locate first responders, such as firefighters, when they are unable to safely leave immediately dangerous to life and health (IDLH) environments. These systems may operate, for example, using high-frequency radio waves that effectively penetrate dense smoke and follow doorways and corridors. In some cases, the systems are a two-part system including a transmitter (emitter) and a hand-held receiver (tracker or locator). Search and rescue personnel may use the hand-held receiver to detect the signal of the first responder's individually-worn transmitter that is either a personally-worn pocket-sized unit or integrated into the first responder's equipment, such as a self-contained breathing apparatus (SCBA). The hand-held receiver can monitor and scroll through a plurality of personal transmitters, so that as one first responder is found or removed from the scene, the receiver accepts the transmission of another first responder. The hand-held receiver may select (e.g., filter) among multiple received transmissions from multiple first responders to show a selected first responder (e.g., a downed first responder) in a user interface. However, solutions for downed first responder location finding lack elevation/floor level detection capabilities.

SUMMARY

Some embodiments advantageously provide a method and system for locating a downed first responder that utilizes an unmanned aerial vehicle (UAV) for elevation and/or floor level detection in combination with an emitter device (i.e., transmitting personal unit) and tracker (i.e., receiver) device, such as the 3M' Pak-Tracker Locator™ system. A tracker device for a first responder including a radio is configured to receive a first radio signal from an emitter, and receive a second radio signal from a UAV. The second radio signal includes at least one data packet including location information associated with the emitter. Processing circuitry in communication with the radio is configured to determine at least one location parameter associated with the emitter based on the first radio signal and the location information of the at least one data packet of the second radio signal

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
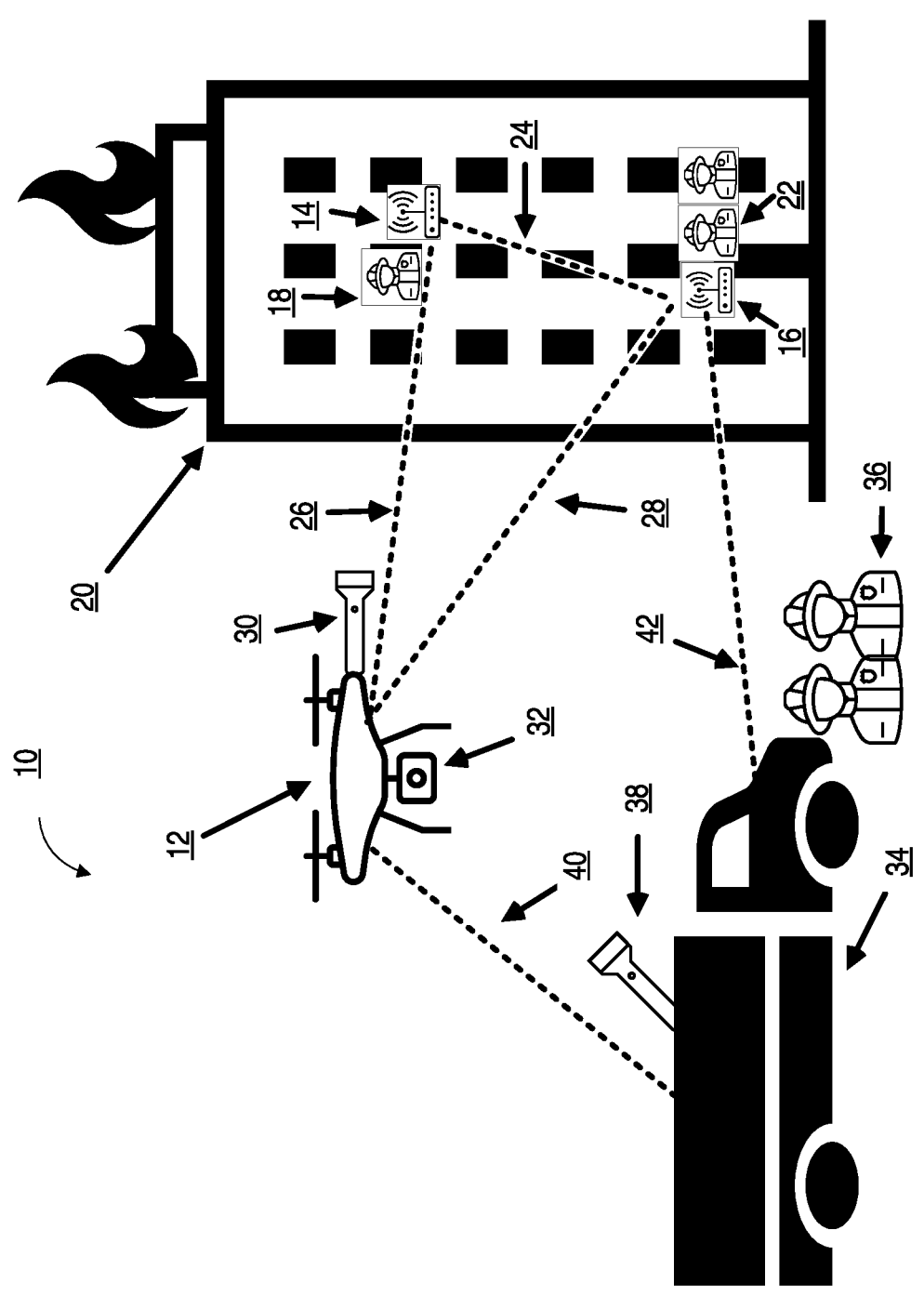
FIG. 1 is a schematic diagram of various devices and components according to some embodiments of the present invention.

Before describing in detail exemplary embodiments, it is noted that the embodiments reside primarily in combinations of apparatus components and processing steps related to locating a downed first responder. Accordingly, the system and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example One having ordinary skill in the art will appreciate that multiple components may interoperate and modifications and variations are possible of achieving the electrical and data communication.

Referring now to the drawing figures, in which like reference designators refer to like elements, FIG. 1 shows an embodiment of a communication system 10 that utilizes a UAV 12, an emitter 14, and a tracker 16 to locate a downed/incapacitated first responder 18 inside of a building 20 and/or emergency scene. The downed/incapacitated first responder 18 is a downed or lost first responder who is in the building 20 (and/or in an emergency scene) and needs to be rescued. The emitter 14 may be worn by, removably attached to, carried by, and/or held by first responder 18. The tracker 16 may be worn by, attached to, carried by, and/or held by one or more members of a rapid intervention team (RIT) 22 responsible for rescuing the downed first responder 18.

In some embodiments, a 3-way wireless communication network is created between UAV 12, emitter 14, and tracker 16 of communication system 10. In some embodiments, emitter 14 emits radio signal 24 that the tracker 16 detects. In some embodiments, emitter 14 emits radio signal 26 that the UAV 12 detects. In some embodiments, emitter 14 sends data, e.g., as data packets encoded in radio signal 24 and/or radio signal 26, which may be received by tracker 16 and UAV 12, respectively. Emitter 14 may also receive data packets from tracker 16 and UAV 12. UAV 12 may also communicate data with tracker 16, e.g., via communication channel 28. UAV 12, emitter 14, and/or tracker 16 may be configured to communicate with a public land mobile network (PLMN), such as a 4G/5G network, and to send/receive data via the PLMN to one another and/or to other devices/entities, such as to a third-party server via an application programming interface (API).

In some embodiments, UAV 12 detects the elevation of first responder 18 and/or the floor level of building 20 on which first responder 18 is located and/or RIT 22 is located. In some embodiments, UAV 12 also has a light source 30 used to illuminate the area/floor of interest on the building 20, e.g., the floor on which first responder 18 is located and/or RIT 22 is located. In some embodiments, UAV 12 includes image sensor 32, which may include a thermal imaging sensor. In some embodiments, a vehicle 34, which may be any type of emergency support vehicle, such as a firetruck, operated by first responders 36, may be outside of building 20 (and/or an emergency scene), and may include a vehicle light 38. In some embodiments, vehicle light 38 is an autonomous or "smart" light, which automatically tracks the UAV 12 to ensure a continuous spotlight on UAV 12. In some embodiments, vehicle light 38 is manually operable by first responders 36. Vehicle 34 may communicate data with UAV 12, e.g., via communication channel 40. For example, UAV 12 may send sensor readings/data from one or more sensors to vehicle 34. UAV 12 may receive data including instructions, e.g., flight directions, from vehicle 34, and/or from a remote server (not shown), e.g., via a PLMN. First responders 36 may direct and/or command the rescue operation.

In some embodiments, UAV 12 light source 30 is an autonomous or "smart" light, which automatically tracks the area/floor of interest on the building 20 (e.g., based on the location of emitter 14 and/or tracker 16) to ensure continuous illumination of the area/floor of interest. In some embodiments, UAV 12 light source 30 is manually operable, e.g., by first responders 36, e.g., using instructions and other data sent, e.g., via communication channel 40.

In some embodiments, the emitter 14 may be a SCBA emitter and/or transmitter and/or may be integrated into/attached to a SCBA. In some embodiments, the emitter 14 may be a 3M™ Scott™ PASS Alarm or similar device. In some embodiments, the emitter 14 may be a non-removable device, such as a non-removable PASS Alarm device. In some embodiments, a non-removable device/non-removable PASS Alarm may be characterized as "non-removable" according to a regulatory standard. In some embodiments, a non-removable device/non-removable PASS Alarm may be integrated into/attached to other first responder equipment (e.g., a SCBA, turnout gear/clothing, helmet, gloves, facepiece, mask mounted regulator (MMR), etc.).

In some embodiments, the tracker 16 may be a SCBA tracker device and/or may be integrated into/attached to a SCBA and/or other first responder equipment (e.g., turnout gear/clothing, helmet, gloves, facepiece, mask mounted regulator (MMR), etc.). In some embodiments, the tracker 16 may be a hand-held receiver (HHR) device. In some embodiments, the tracker 16 may be a 3M™ Scott™ Pak-Tracker locator device or similar device.

In some embodiments, tracker 16 may also communicate with vehicle 34, either directly via communication channel 42, or by communicating with UAV 12 via communication channel 28, wherein the UAV 12 is configured to relay the communication to/from vehicle 34, e.g., via communication channel 40. In some embodiments, emitter 14 may also communicate with vehicle 34, e.g., by communicating with UAV 12 via radio signal 26, wherein the UAV 12 is configured to relay the communication to/from vehicle 34, e.g., via communication channel 40. Alternatively, or additionally, emitter 14 may be configured to send/receive data via a direct wireless communication channel (not shown) with vehicle 34, and/or via a PLMN.

Figure 2:
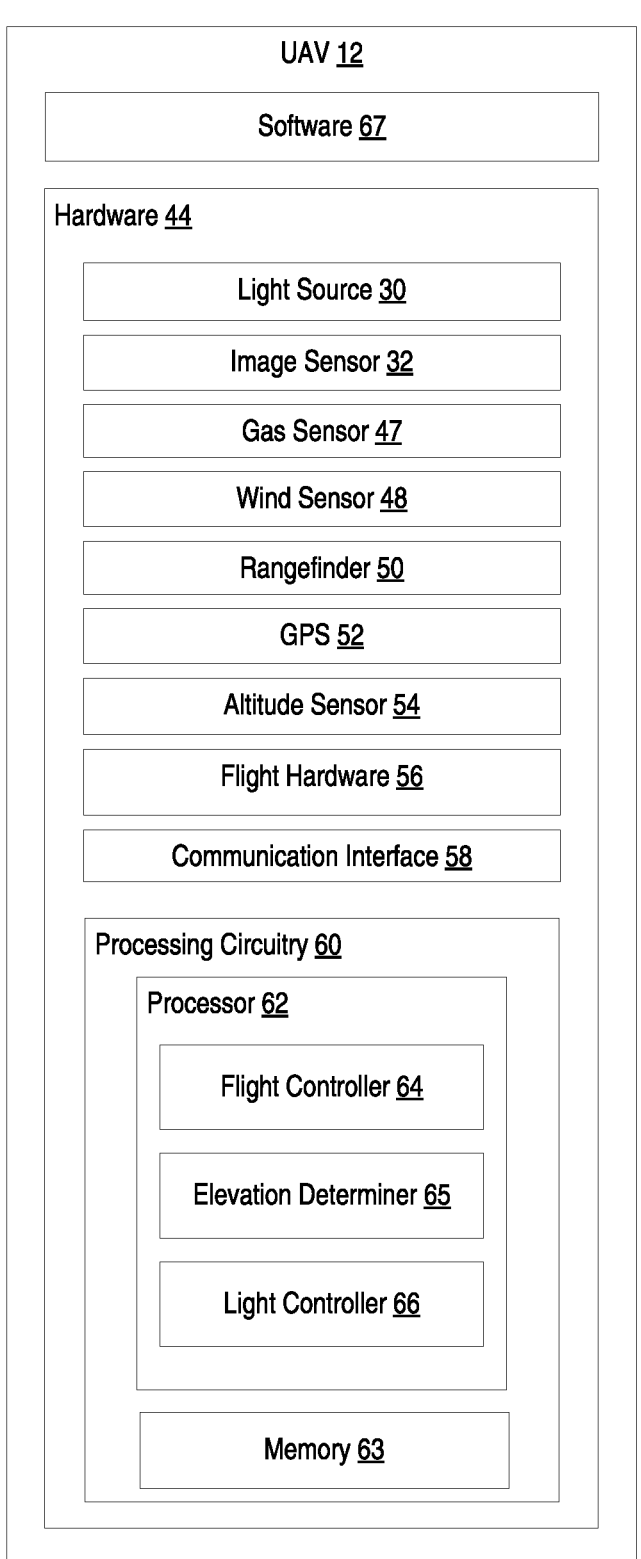
FIG. 2 is a block diagram of an example unmanned aerial vehicle (UAV) according to some embodiments of the present invention.

Referring now to FIG. 2, a UAV 12 may include hardware 44, including image sensor 32, light source 30, gas sensor 47, wind sensor 48, rangefinder 50, global positioning system (GPS) sensor 52, altitude sensor 54, flight hardware 56, communication interface 58, and processing circuitry 60. The processing circuitry 60 may include a processor 62 and a memory 63. In addition to, or instead of a processor, such as a central processing unit, and memory, the processing circuitry 60 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 62 may be configured to access (e.g., write to and/or read from) the memory 63, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

UAV 12 may further include software 67 stored internally in, for example, memory 63 or stored in external memory (e.g., database, storage array, network storage device, etc.) accessible by UAV 12 via an external connection. The software 67 may be executable by the processing circuitry 60. The processing circuitry 60 may be configured to control any of the methods and/or processes described herein and/or to cause such methods, and/or processes to be performed, e.g., by UAV 12. Processor 62 corresponds to one or more processors 62 for performing UAV 12 functions described herein. The memory 63 is configured to store data, programmatic software code and/or other information described herein. In some embodiments, the software 67 may include instructions that, when executed by the processor 62 and/or processing circuitry 60, causes the processor 62 and/or processing circuitry 60 to perform the processes described herein with respect to UAV 12. For example, UAV 12 may include flight controller 64 configured to perform one or more UAV 12 functions as described herein, such as directing flight hardware 56 (e.g., autonomously and/or manually), e.g., to maintain a constant elevation in the air, to change the direction of UAV 12, to move UAV 12 along a vertical and/or horizontal axis, to move closer to a location and/or elevation of emitter 14 or tracker 16, to move around (e.g., randomly or according to a predefined flight pattern) the perimeter of building 20 searching for signals (e.g., radio signal 26) from emitter 14 and/or tracker 16, etc., as described herein. Processing circuitry 60 of the UAV 12 may include elevation determiner 65 configured to perform one or more UAV 12 functions as described herein such as determining an elevation of the UAV 12, determining an elevation/floor level of the emitter 14, and determining an elevation/floor level of the tracker 16, as described herein. Processing circuitry 60 of UAV 12 may include light controller 66 configured to perform one or more UAV 12 functions as described herein such as adjusting (e.g., autonomously and/or manually) the direction (e.g., via a mechanical adjustment and/or electronic adjustment) of the light beam(s) emitted from the light source 30 (e.g., to maintain a spotlight on area/floor level of the building in which emitter 14 and/or tracker 16 is/are located), as described herein.

Image sensor 32 may be implemented by any device, either standalone or part of UAV 12, that is configurable for capturing images, thermal images, video, audio, etc., of building 20 and/or an emergency scene.

Light source 30 may be implemented by any device, either standalone or part of UAV 12, that is configurable for directing one or more light beams (e.g., a fixed or movable spotlight) on a particular area/floor of building 20.

Gas sensor 47 may be implemented by any device, either standalone or part of UAV 12, that is configurable for presence and/or concentration of one or more gases, e.g., in the vicinity of UAV 12.

Wind sensor 48 may be implemented by any device, either standalone or part of UAV 12, that is configurable for detecting wind speed and/or direction, e.g., experienced by UAV 12.

Rangefinder 50 may be implemented by any device, either standalone or part of UAV 12, that is configurable for detecting distances, e.g., a distance between UAV 12 and a particular surface area of building 20, a distance between UAV 12 and a ground surface, etc.

Global positioning system (GPS) sensor 52 may be implemented by any device, either standalone or part of UAV 12, that is configurable for detecting location/coordinate signals (e.g., signals transmitted from a global navigation satellite system and/or a PLMN) and/or determining a geographical coordinate, e.g., of UAV 12.

Altitude sensor 54 may be implemented by any device, either standalone or part of UAV 12, that is configurable for detecting an elevation/altitude, e.g., the elevation of UAV 12. Altitude sensor 54 may include a barometer, altimeter, microgravity elevation/altitude sensor(s), radar, lidar, optical sensor, quantum accelerometer sensor, and/or any other sensors/devices configurable for detecting an elevation/altitude.

Flight hardware 56 may be implemented by any device, either standalone or part of UAV 12, that is configurable for providing flight for UAV 12, including motors, actuators, etc. for changing UAV 12's elevation in the air, changing the direction of UAV 12, moving UAV 12 along a vertical and/or horizontal axis, etc.

Communication interface 58 may include a radio interface configured to set up and maintain a wireless connection (e.g., with vehicle 34 via communication channel 40, with emitter 14 via radio signal 26, with tracker 16 via communication channel 28, with remote servers via a PLMN, etc.). The radio interface may be formed as, or may include, for example, one or more radio frequency, RF (radio frequency) transmitters, one or more RF receivers, and/or one or more RF transceivers. In some embodiments, UAV 12 may send, via the communication interface 58, sensor readings and/or data from one or more of image sensor 32, gas sensor 47, wind sensor 48, rangefinder 50, GPS sensor 52, and/or altitude sensor 54 to emitter 14, tracker 16, vehicle 34, additional UAVs (not shown), and/or a remote server (e.g., a third-party incident command server utilizing an API, not shown).

Figure 3:
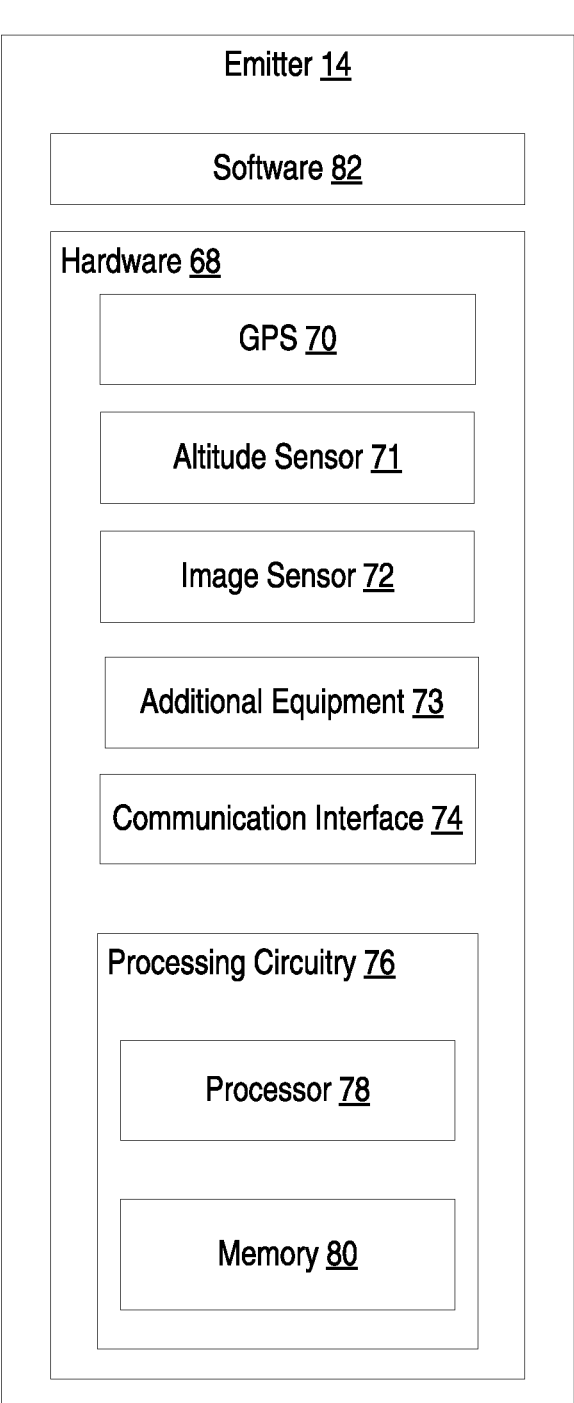
FIG. 3 is a block diagram of an example emitter according to some embodiments of the present invention.

Referring now to FIG. 3, the communication system 10 further includes emitter 14. Emitter 14 may include hardware 68, including GPS sensor 70, altitude sensor 71, image sensor 72, additional equipment 73, communication interface 74, and processing circuitry 76. The processing circuitry 76 may include a processor 78 and a memory 80. In addition to, or instead of a processor, such as a central processing unit, and memory, the processing circuitry 76 may comprise integrated circuitry for processing and/or control, e.g., one or more processors and/or processor cores and/or FPGAs (Field Prog)rammable Gate Array) and/or ASICs (Application Specific Integrated Circuitry) adapted to execute instructions. The processor 78 may be configured to access (e.g., write to and/or read from) the memory 80, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Emitter 14 may further include software 82 stored internally in, for example, memory 80 or stored in external memory (e.g., database, storage array, network storage device, etc.) accessible by emitter 14 via an external connection. The software 82 may be executable by the processing circuitry 76. The processing circuitry 76 may be configured to control any of the methods and/or processes described herein and/or to cause such methods, and/or processes to be performed, e.g., by emitter 14. Processor 78 corresponds to one or more processors 78 for performing emitter 14 functions described herein. The memory 80 is configured to store data, programmatic software code and/or other information described herein. In some embodiments, the software 82 may include instructions that, when executed by the processor 78 and/or processing circuitry 76, causes the processor 78 and/or processing circuitry 76 to perform the processes described herein with respect to emitter 14.

GPS sensor 70 may be implemented by any device, either standalone or part of emitter 14, that is configurable for detecting location/coordinate signals (e.g., signals transmitted from a global navigation satellite system and/or a PLMN) and/or determining a geographical coordinate, e.g., of emitter 14.

Altitude sensor 71 may be implemented by any device, either standalone or part of emitter 14, that is configurable for detecting an elevation, e.g., the elevation of emitter 14. In some implementations, altitude sensor 71 may include a barometer, altimeter, microgravity elevation/altitude sensor(s), radar sensor(s), lidar, optical sensor, quantum accelerometer sensor, and/or any other sensors/devices configurable for detecting an elevation/altitude.

Image sensor 72 may be implemented by any device, either standalone or part of emitter 14, that is configurable for capturing images, thermal images, video, audio, etc. (e.g., of the environment in which emitter 14 is located).

Additional equipment 73 may include any other devices/components/sensors/etc. configurable for performing one or more emitter 14 functions as described herein, including, for example, a sound-emitting device, such as a speaker/buzzer and/or piezo-electronic device configurable for audible output and/or any other output (e.g., vibrations, haptic feedback, flashing lights, etc.) configurable for emitting an alert/alarm. In some embodiments, such audible output may be configurable for operating in accordance with regulatory standards.

Communication interface 74 may include a radio interface configured to set up and maintain a wireless connection (e.g., with UAV 12 via radio signal 26, with tracker 16 via radio signal 24, with remote servers via a PLMN, etc.). The radio interface may be formed as, or may include, for example, one or more radio frequency, RF transmitters, one or more RF receivers, and/or one or more RF transceivers. Communication interface 74 may transmit, receive, communicate, etc. according to one or more communication protocols and/or standards, including, for example, LoRa, ZigBee, WiFi, Bluetooth, Sigfox, IEEE 802.15.X (e.g., IEEE 802.15.4), and/or any other internet of things (IoT), cellular, or other wireless protocols and/or standards. In one or more embodiments, the radio interface may communicate according to a spread spectrum communication protocol/standard.

Communication interface 74 and/or processing circuitry 76 may be configurable for determining information, such as metadata, characteristics, data packets, etc. from transmitted or received signals/channels, such as radio signal 26 and radio signal 24, including, for example, signal strength, angle of arrival (AoA), angle of departure (AoD), transmit (Tx) packet frequency, receive (Rx) packet frequency, etc. The determination may be based on reference signals included in radio signal 24 and/or radio signal 26. Radio signal 24 and/or radio signal 26 may also include information/data, e.g., the identit(ies) of first responder(s), e.g., first responders associated with tracker 16 and/or emitter 14, downed first responder 18, etc., remaining air of first responder 18 and/or other first responders, location of first responder 18 and/or other first responders, alarm status(es) of first responder 18 and/or other first responders, equipment condition of first responder 18 and/or other first responders, such as remaining air, SCBA condition, internal temperature of various components, etc., information about the environment (e.g., temperature), biometric readings of first responder 18 and/or other first responders, etc. In some embodiments, communication interface 74 may transmit and/or receive RF signals having a carrier frequency of approximately 2.4 GHz. In other embodiments, a lower frequency, such as 915 MHz, may be used, where lower frequencies may provide improved penetration, e.g., through walls of building 20. In some embodiments, a higher frequency, such as 5 GHz, may be used, where higher frequencies may provide a more direct line of sight between various transmitting/receiving devices. In some embodiments, communication interface 74 may be configurable to transmit and/or receive an alarm signal according to a pre-defined schedule and/or periodicity, such as transmitting/receiving the alarm signal multiple times per minute, e.g., to provide continually/periodically updated information and improve detection of the alarm by the other components/devices of communication system 10. In some embodiments, communication interface 74 may be configurable for channel switching, e.g., configurable to select transmit/receive channels based on measured channel characteristics, such as interference (e.g., radio frequency interference (RFI)), noise, etc., e.g., selecting the channel with the least noise, the least interference, highest power, highest quality signal, highest signal-to-noise ratio, etc. In some embodiments, communication interface 74 may be configurable for changing (e.g., increasing/decreasing) the transmit (Tx) power, e.g., to achieve optimal communication links.

Figure 4:
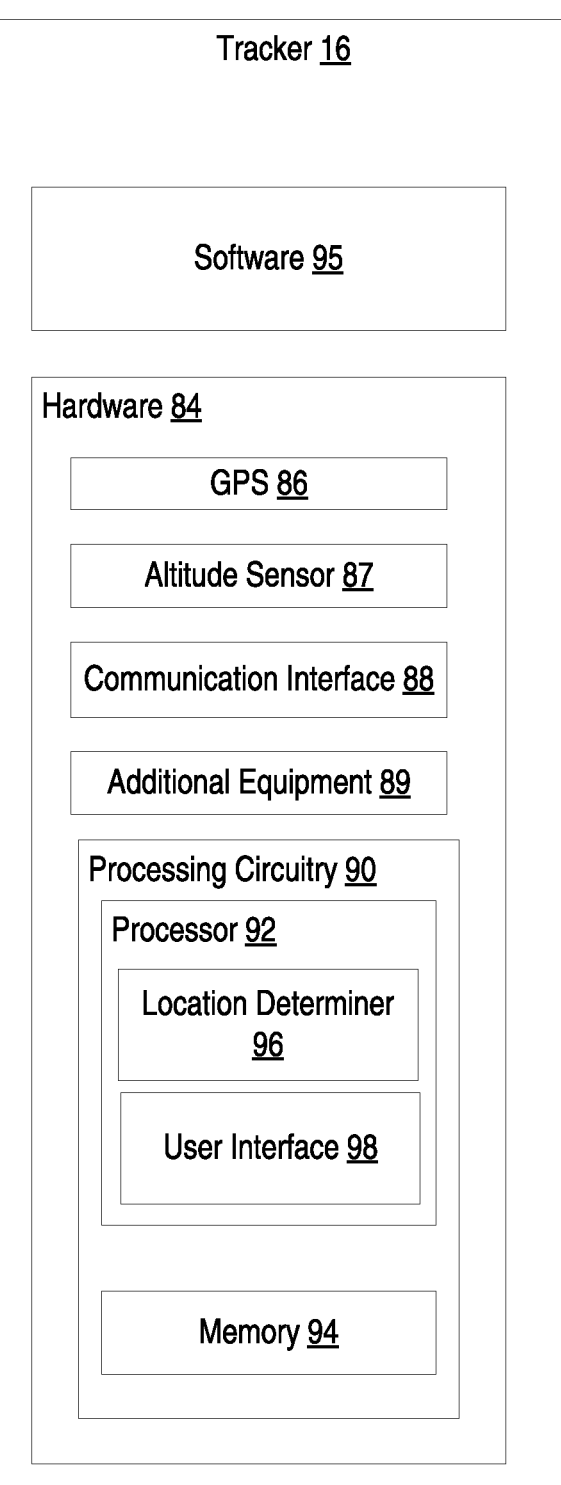
FIG. 4 is a block diagram of an example tracker according to some embodiments of the present invention.

Referring now to FIG. 4, the communication system 10 further includes tracker 16. Tracker 16 may include hardware 84, including GPS sensor 86, altitude sensor 87, communication interface 88, additional equipment 89, and processing circuitry 90. The processing circuitry 90 may include a processor 92 and a memory 94. In addition to, or instead of a processor, such as a central processing unit, and memory, the processing circuitry 90 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 92 may be configured to access (e.g., write to and/or read from) the memory 94, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Tracker 16 may further include software 95 stored internally in, for example, memory 94 or stored in external memory (e.g., database, storage array, network storage device, etc.) accessible by tracker 16 via an external connection. The software 95 may be executable by the processing circuitry 90. The processing circuitry 90 may be configured to control any of the methods and/or processes described herein and/or to cause such methods, and/or processes to be performed, e.g., by tracker 16. Processor 92 corresponds to one or more processors 92 for performing tracker 16 functions described herein. The memory 94 is configured to store data, programmatic software code and/or other information described herein. In some embodiments, the software 95 may include instructions that, when executed by the processor 92 and/or processing circuitry 90, causes the processor 92 and/or processing circuitry 90 to perform the processes described herein with respect to tracker 16. For example, processing circuitry 90 of the tracker 16 may include location determiner 96 configured to perform one or more tracker 16 functions as described herein such as determining a location of the emitter 14 (e.g., based on characteristics of radio signal 24, based on data packet(s) encoded in radio signal 24, and/or based on data packet(s) received from UAV 12 via communication channel 28), and/or determining a location/elevation of the tracker 16 (e.g., based on sensor data from GPS sensor 86 and/or altitude sensor 87), as described herein. Tracker 16 may include user interface 98 configured to perform one or more tracker 16 functions as described herein such as providing indications to a user (e.g., RIT 22) to help guide the user to the location of emitter 14, as described herein.

GPS sensor 86 may be implemented by any device, either standalone or part of tracker 16, that is configurable for detecting signals (e.g., signals transmitted from a global navigation satellite system and/or a PLMN) and/or determining a geographical coordinate, e.g., of tracker 16.

Altitude sensor 87 may be implemented by any device, either standalone or part of tracker 16, that is configurable for detecting an elevation, e.g., the elevation of tracker 16. Altitude sensor 87 may include a barometer, altimeter, microgravity elevation/altitude sensor(s), radar sensor(s), lidar, optical sensor, quantum accelerometer sensor, and/or any other sensors/devices configurable for detecting an elevation/altitude.

Communication interface 88 may include a radio interface configured to set up and maintain a wireless connection (e.g., with UAV 12 via communication channel 28, with emitter 14 via radio signal 24, with remote servers via a PLMN, etc.). The radio interface may be formed as, or may include, for example, one or more radio frequency, RF transmitters, one or more RF receivers, and/or one or more RF transceivers. Communication interface 88 may transmit, receive, communicate, etc. according to one or more communication protocols and/or standards, including, for example, LoRa, ZigBee, WiFi, Bluetooth, Sigfox, IEEE 802.15.X (e.g., IEEE 802.15.4), and/or any other internet of things (IoT), cellular, or other wireless protocols and/or standards. In one or more embodiments, the radio interface may communicate according to a spread spectrum communication protocol/standard.

Communication interface 88 may be configurable for determining information, such as metadata, characteristics, data packets, etc., about transmitted or received signals/channels, such as communication channel 28, radio signal 24, radio signal 26, etc., including, for example, signal strength, angle of arrival (AoA), angle of departure (AoD), transmit (Tx) packet frequency, receive (Rx) packet frequency, etc. The determination may be based on reference signals included in radio signal 24, radio signal 26, communication channel 28, etc. Radio signal 24, radio signal 26, communication channel 28, etc. may also include information/data, e.g., the identit(ies) of first responder(s), e.g., first responders associated with tracker 16 and/or emitter 14, downed first responder 18, etc., remaining air, SCBA condition, internal temperature of various components, etc., information about the environment (e.g., temperature), biometric readings of first responder 18 and/or other first responders, etc. In some embodiments, communication interface 88 may transmit and/or receive RF signals having a carrier frequency of approximately 2.4 GHz. In other embodiments, a lower frequency, such as 915 MHz, may be used, where lower frequencies may provide improved penetration, e.g., through walls of building 20. In some embodiments, a higher frequency, such as 5 GHz, may be used, where higher frequencies may provide a more direct line of sight between various transmitting/receiving devices. In some embodiments, communication interface 88 may be configurable to transmit and/or receive an alarm signal according to a pre-defined schedule and/or periodicity, such as transmitting/receiving the alarm signal multiple times per minute, e.g., to provide continually/periodically updated information and improve detection of the alarm by the other components/devices of communication system 10. In some embodiments, communication interface 88 may be configurable for bidirectional communication. In some embodiments, communication interface 88 may be configurable for channel switching, e.g., configurable to select transmit/receive channels based on measured channel characteristics, such as interference (e.g., radio frequency interference (RFI)), noise, etc., e.g., selecting the channel with the least noise, the least interference, etc. In some embodiments, communication interface 88 may be configurable for changing (e.g., increasing/decreasing) the transmit (Tx) power, e.g., to achieve optimal communication links.

Additional equipment 89 may include any other devices/components/sensors/etc. configurable for performing one or more tracker 16 functions as described herein, including, for example, an accelerometer, a flashlight, a speaker, one or more antennas, including, e.g., directional (e.g., left/right) antennas/main antenna, and/or a display/screen, e.g., a passive matrix vertical alignment (PMVA) display, a liquid crystal display (LCD) screen, organic light-emitting diode (OLED) display, etc.

In some embodiments, RIT 22 is sent into the fire in building 20 to find downed first responder 18. Downed first responder 18 may have an emitter 14, e.g., attached to first responder 18's equipment and/or SCBA unit. Emitter 14 may be configured to emit detectable radio signals (e.g., radio signal 24 and radio signal 26), which may be detectable by UAV 12 and/or tracker 16. Radio signal 24 and radio signal 26 may begin emitting from emitter 14, e.g., upon first responder 18 manually initiating a distress mode of emitter 14 (e.g., by pushing a distress button on the emitter 14 or by issuing a voice command to trigger emitter 14), or emitter 14 may autonomously emit distress signals, e.g., if the first responder 18 does not respond to an alert/notification within a predefined time period, or if biometric readings associated with first responder 18 (e.g., biometric readings taken by sensors in first responder 18's SCBA unit) exceed a predefined threshold. Distress signals may include, e.g., radio signals, e.g., transmitted by emitter 14 to tracker 16 and/or any other component/device of communication system 10, and/or may include audible signals or any other signals/alerts/indications, such as an audible output, vibrations, haptic feedback, flashing lights, etc. In some embodiments, some distress signals (e.g., audible output) may be in accordance with regulatory standards. In some embodiments, biometric readings may include, e.g., detection/measurements of first responder 18 body movement, e.g., detected by an accelerometer. For example, biometric sensors, e.g., an accelerometer inside emitter 14 triggers an alert (e.g., a piezo buzzer/speaker, haptic feedback device, flashing lights, etc.) to send warnings (e.g., audible beeps) when little or no motion (e.g., body movement) is detected for a pre-determined amount of time. In some embodiments, after multiple (e.g., continuous) stages of warnings (e.g., a first pre-alarm, a second pre-alarm, etc.) the full alarm (e.g., PASS alarm) may be triggered. A first responder (e.g., first responder 18) may respond to (e.g., disarm, turn off, etc.) a first and/or second pre-alarms (which may not be the same as the full/PASS alarm), for example, by "wiggling" or moving quickly, e.g., to reset the biometric readings, accelerometer, etc., by pressing a button to disarm the alarm, etc.

Tracker 16 may guide RIT 22 to the downed first responder 18. Tracker 16 may detect characteristics (e.g., amplitude, phase, frequency, modulation, angle of arrival, angle of departure, etc.) of radio signal 24 emitted by emitter 14, compare the characteristics to one or more parameters, and determine a direction and/or distance of emitter 14 relative to tracker 16 based on the comparison. In some embodiments, tracker 16 may detect, e.g., distance, direction, etc., for example, and may be based on one or more characteristics/measurements of the received signals, e.g., based on a Link Quality Indicator ("LQI"), Received Signal Strength Indication ("RSSI"), etc. For example, a signal (e.g., a 2.4 GHz frequency radio signal) transmitted from emitter 14 to tracker 16 may be measured/detected by tracker 16 to determine characteristics such as LQI, RSSI, signal strength percentage, etc. In some embodiments, an associated color bar graph (e.g., a light emitting diode (LED) stack on a printed circuit board (PCB)) may be displayed based on the characteristics (e.g., the signal strength percentage). For example, the signal strength percentage and bar graph colors may be associated based on a mapping (e.g., 100%=Green, 25%=Red, etc.). Tracker 16 may also, or alternatively, receive one or more data packets encoded in radio signal 24, the one or more data packets including location information associated with the emitter 14. For example, the location information may include sensor data (e.g., geographic coordinates, images) e.g., determined/generated by sensors in the emitter 14. Tracker 16 may indicate to RIT 22 (e.g., via a visual and/or audio indication, such as via user interface 98), the relative direction and distance of emitter 14. As the RIT 22 carrying the tracker 16 moves throughout the building 20, its location changes relative to emitter 14, and the characteristics of radio signal 24 detected by tracker 16 and/or location data received from UAV 12 may change accordingly. Tracker 16 will continuously and/or periodically recalculate the relative direction/distance of the emitter 14 based on radio signal 24 (e.g., compared to sensor readings of the tracker 16, such as GPS sensor 86 and altitude sensor 87) and/or data received from UAV 12, and may indicate to the RIT 22 (e.g., via user interface 98) whether RIT 22 is getting closer to or farther away from downed first responder 18.

An exemplary scenario is as follows. A downed first responder 18 becomes disoriented, incapacitated, lost, and/or trapped in building 20. The downed first responder 18 requests help (e.g., by pressing a button which triggers the emitter 14, issuing a voice command to trigger the emitter 14, or automatically based on a determination that the downed first responder 18 is not actively moving, or in a supine or otherwise unexpected position for the environment), and the emitter 14 begins to emit radio signal 24 detectable by tracker 16, and also emits radio signal 26 detectable by UAV 12. In some embodiments, the emitter 14 may autonomously begin emitting radio signal 24 and radio signal 26, e.g., if biometric measurements (e.g., heart rate, blood oxygen level, lack of movement, etc.) associated with first responder 18 exceed at least one predetermined threshold. First responders 36 outside the building 20 (and/or outside of the emergency scene) may deploy UAV 12 to help find the elevation of downed first responder 18. In some embodiments, emitter 14 may emit, in addition to or as an alternative to radio signal 24 and/or radio signal 26, an audible signal, an optical signal, and/or any other type of signaling which is detectable by tracker 16 and/or UAV 12.

As RIT 22 progresses through building 20, tracker 16, UAV 12, emitter 14, and/or vehicle 34 may communicate with each other using radio signal 24, radio signal 26, communication channel 28, communication channel 40, and/or communication channel 42, and/or may communicate with each other and/or a remote server via a PLMN.

UAV 12 attempts to locate first responder 18 based on one or more characteristics of radio signal 26, based on data encoded in radio signal 26 (the data packets including location information), and/or based on data received from tracker 16 via communication channel 28. For example, UAV 12 may detect characteristics (e.g., amplitude, phase, frequency, modulation, angle of arrival, angle of departure, etc.) of radio signal 26 emitted by emitter 14, compare the characteristics to one or more parameters, and determine a direction and/or distance of emitter 14 relative to UAV 12 based on the comparison. In some embodiments, the direction and/or distance may be determined based on signal strength, time of arrival, angle of arrival, and/or other known RF methods of finding distance, direction, etc., e.g., based on the RF physical layer. UAV 12 may also receive location data from tracker 16, e.g., data including and/or based on characteristics of radio signal 24, via communication channel 28 (e.g., via radio signals transmitted by tracker 16 via communication channel 28). UAV 12 may determine a location, elevation, and/or floor of emitter 14 based on radio signal 26 received from emitter 14, based on data packets including location information encoded in radio signal 26 received from emitter 14, and/or based on data packets including location information received from tracker 16.

UAV 12 may manually (e.g., directed by first responders 36) fly around building 20, searching for signals, e.g., radio signal 26 and/or 28, and communicate to first responders 36, e.g., via communication channel 40, whether UAV 12 is detecting signals and/or emitter 14 and/or tracker 16. UAV 12 may autonomously fly around building 20, e.g., randomly and/or according to a predefined flight pattern, to search for signals. For example, UAV 12 may circle the perimeter of building 20, and generate a map of signal characteristics/strength (e.g., based on characteristics, such as signal strength, signal power, signal-to-noise ratio, angle of arrival, angle of departure, etc., of radio signal 26 from emitter 14, signals transmitted via communication channel 28 from tracker 16, etc.). UAV 12 may choose a location in the signal map, (e.g., the location association with the signal characteristics such as highest strength signal, angle of arrival, angle of departure, etc.), which may be used to determine the location of emitter 14 and/or tracker 16. Once a location with highest signal strength from emitter 14 and/or tracker 16 has been determined, UAV 12 may hover at or near that location (e.g., to provide a spotlight on that location using light source 30), or UAV 12 may continue to circle building 20 (e.g., to search for other downed first responders, to determine if there is a location with a higher signal strength, i.e., a better match for the location of emitter 14, to search for tracker 16's location, etc.). As UAV 12 locates the downed first responder 18, vehicle light 38 automatically/autonomously tracks UAV 12 to provide greater vision/knowledge to first responders 36. Light source 30 of UAV 12 also tracks the floor/area of building 20 on which emitter 14 and/or tracker 16 is located.

In some embodiments, once tracker 16 is on the same elevation/floor as emitter 14, tracker 16 may initiate an alarm mode, including displaying/announcing an indication to RIT 22 of the situation. In some embodiments, tracker 16 may only be able to determine its position in the "X/Y" plane of building 20, i.e., tracker 16 may be able to determine its (x, y) coordinate with respect to emitter 14 in building 20, and tracker 16 may be unable to determine whether it is on the same floor/elevation as emitter 14, i.e., along the 'z'-axis of building 20. For example, in some embodiments, tracker 16 may show strong signal strength from signals detected from emitter 14, but tracker 16 may be below or above emitter 14, and may not be able to determine (without additional input), for instance, whether it is above or below or on the same floor as emitter 14. Thus, in some embodiments, tracker 16 may benefit from receiving signals/information from UAV 12 (e.g., information regarding the z-axis of emitter 14 and/or tracker 16), so that tracker 16 may determine that tracker 16 is on the same elevation/floor as emitter 14 (i.e., may determine tracker 16's and/or emitter 14's z-axis coordinates) based on, e.g., information received from UAV 12. Tracker 16 may also communicate an indication to vehicle 34, either via communication channel 42 or via communication channel 28 and communication channel 40 and UAV 12, that tracker 16 is on the same elevation/floor as emitter 14.

As RIT 22 and now-rescued downed first responder 18 make their way out of building 20, UAV 12 may descend to match the first responders' (i.e., RIT 22 and now-rescued downed first responder 18) elevation, and/or match the tracker 16 elevation, and/or match the emitter 14 elevation. In some embodiments, emitter 14 may be configured to turn off/enter silent mode/recovery mode (e.g., stop emitting signals, alarms, etc.) once downed first responder 18 has been located, and/or a user (e.g., first responder 18) may turn it off/change modes manually. In some embodiments, emitter 14 may be operable in a recovery mode, silent mode, etc., in which emitter 14 may stop emitting an audible alarm, but may continue to emit signals, such as radio signal 24 and/or radio signal 26. In some embodiments, emitter 14 may be configured to broadcast (e.g., transmit via radio signal 24 and/or radio signal 26) its mode/status, e.g., to UAV 12 and/or tracker 16 and/or any other device/component of communication system 10. In some embodiments, UAV 12 and/or tracker 16 may perform one or more actions in response to receiving the broadcast mode/status of emitter 14. For example, UAV 12 may be configured to change a color of light source 30 based on the emitter 14 entering a recovery/silent mode.

During this time, the vehicle light 38 may continue to automatically/autonomously track the UAV 12 as it descends, while UAV 12 light source 30 may still be illuminating the side/elevation of building 20 where RIT 22 and first responder 18 are located, thereby visually indicating the position to first responders 36.

In some embodiments, UAV 12 includes a communication interface 58 configured to communicate with a mobile communications network (e.g., a PLMN), e.g., to obtain location and/or elevation information of UAV 12.

UAV 12 may use a variety of techniques to determine the floor of a building on which downed first responder 18 is located, non-limiting examples of which are described herein.

In some embodiments, memory 63 of UAV 12, memory 80 of emitter 14, and/or memory 94 of tracker 16 stores a physical description (e.g., a model, blueprint, floor plan, etc.) of building 20. In other embodiments, the physical description of building 20 may be stored remotely, e.g., in a remote server and/or cloud computing node, accessible by UAV 12, emitter 14, and/or tracker 16, e.g., via communication interface 58, communication interface 74, and/or communication interface 88.

In some embodiments, UAV 12 may use conventional structural modeling techniques known in the art, such as computer vision and machine learning, to generate a physical description/model of building 20 to aid in determining what floor/elevation emitter 14 and/or tracker 16 are located on. For example, UAV 12 may use a combination of sensors (e.g., image sensor 32, gas sensor 47, wind sensor 48, rangefinder 50, GPS sensor 52, altitude sensor 54), sensor/location data obtained from emitter 14 and/or tracker 16, and/or other geographic/survey/blueprint data (e.g., stored in memory 63), to generate and/or modify a physical description/model of building 20. In some embodiments, the physical description/model may be based on pre-plan (e.g., fire department pre-incident plan) information, smart city installation information, building permits, public records, etc. In some embodiments, the physical description of building 20 includes a mapping of altitudes/elevations and floors. In some embodiments, UAV 12 may use simultaneous location and mapping (SLAM) techniques for generating a physical description/model of building 20 and/or determining what floor/elevation emitter 14 and/or tracker 16 are located on. In some embodiments, UAV 12 may use computer vision techniques based on, for example, measurements of visible light, radar (including active, semi-active and passive), lidar, thermal imaging, acoustics, etc.

UAV 12 may determine the altitude/floor of emitter 14 a variety of ways. For example, UAV 12 may receive radio signal 26 from emitter 14, and may be able to determine based on characteristics of radio signal 26 from emitter 14, whether UAV 12 is at the same altitude as emitter 14, or if UAV 12 is below or above emitter 14, and/or a z-axis of UAV 12 and/or emitter 14. For example, signal characteristics such as highest strength signal, angle of arrival, angle of departure, etc., which may be used to determine the location of emitter 14. UAV 12 may compare the characteristics of radio signal 26 with the characteristics of a reference signal to determine the location of emitter 14. Additionally, or alternatively, UAV 12 may receive an altitude reading directly from emitter 14 and/or from tracker 16 (e.g., as information in a data packet). UAV 12 may use the model of building 20, e.g., stored in memory 63, to determine the floor of emitter 14 based on the altitude of emitter 14, e.g., using a mapping of altitudes to corresponding floors.

For example, UAV 12 may determine that a particular area/location of building 20 (e.g., the determined location of emitter 14) has an elevation of thirty feet relative to the ground. The physical description of building 20 may include a mapping, for example, a mapping of an altitude of thirty feet to the third floor of building 20. UAV 12 determines based on this mapping that the area/location of interest in building 20 is the third floor, and communicates this floor information, e.g., via communication channel 28 to tracker 16, and/or via communication channel 40 to vehicle 34. User interface 98 of tracker 16 indicates this received floor information to a user, e.g., via a graphical and/or audio indication of user interface 98. UAV 12 may use similar techniques to determine the elevation/floor level of tracker 16, and may communicate this floor information to tracker 16 as well. Tracker 16 may be configured to indicate, e.g., via user interface 98, whether tracker 16 is on the same floor as emitter 14, or on a floor above or below emitter 14, as described herein.

Figure 5:
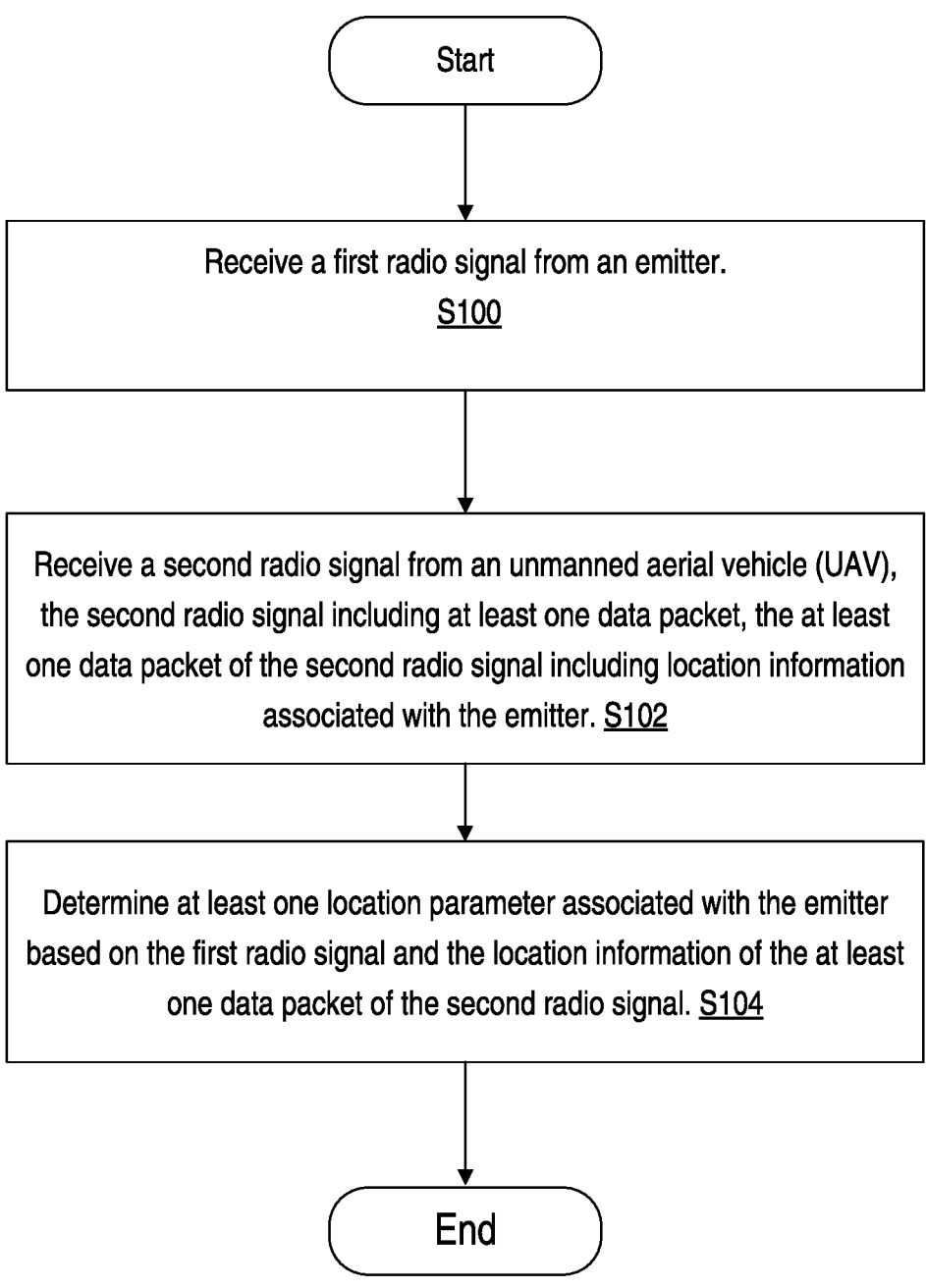
FIG. 5 is a flowchart of an example process in a tracker device according to some embodiments of the present invention.

FIG. 5 is a flowchart of an example process in a tracker 16 according to some embodiments of the invention. One or more blocks described herein may be performed by one or more elements of tracker 16, such as by one or more of processing circuitry 90, GPS sensor 86, altitude sensor 87, location determiner 96, user interface 98, communication interface 88, and/or additional equipment 89. Tracker 16 is configured to receive (Block S100) a first radio signal 24 from an emitter 14. Tracker 16 is configured to receive (Block S102) a second radio signal from an unmanned aerial vehicle (UAV) 12, the second radio signal including at least one data packet, the at least one data packet of the second radio signal including location information associated with the emitter 14. Tracker 16 is configured to determine (Block S104) at least one location parameter associated with the emitter 14 based on the first radio signal 24 and the location information of the at least one data packet of the second radio signal.

According to one or more embodiments, at least one data packet of the second radio signal includes an elevation parameter.

According to one or more embodiments, the tracker 16 is configured to provide an indication to a user based on at least one of: a distance to the emitter 14, a geographic coordinate of the emitter 14, and the elevation parameter. The distance is determined based on the at least one location parameter. The geographic coordinate is determined based on the at least one location parameter.

According to one or more embodiments, tracker 16 is further configured to determine a floor level parameter.

According to one or more embodiments, tracker 16 is further configured to determine the floor level parameter based on at least one of a model of a building 20 in which the emitter 14 is located and the elevation parameter.

According to one or more embodiments, the indication provided to the user includes the floor level parameter.

According to one or more embodiments, the first radio signal 24 includes at least one data packet including at least one location parameter associated with the emitter 14.

According to one or more embodiments, the first radio signal 24 includes at least one reference signal.

Figure 6:
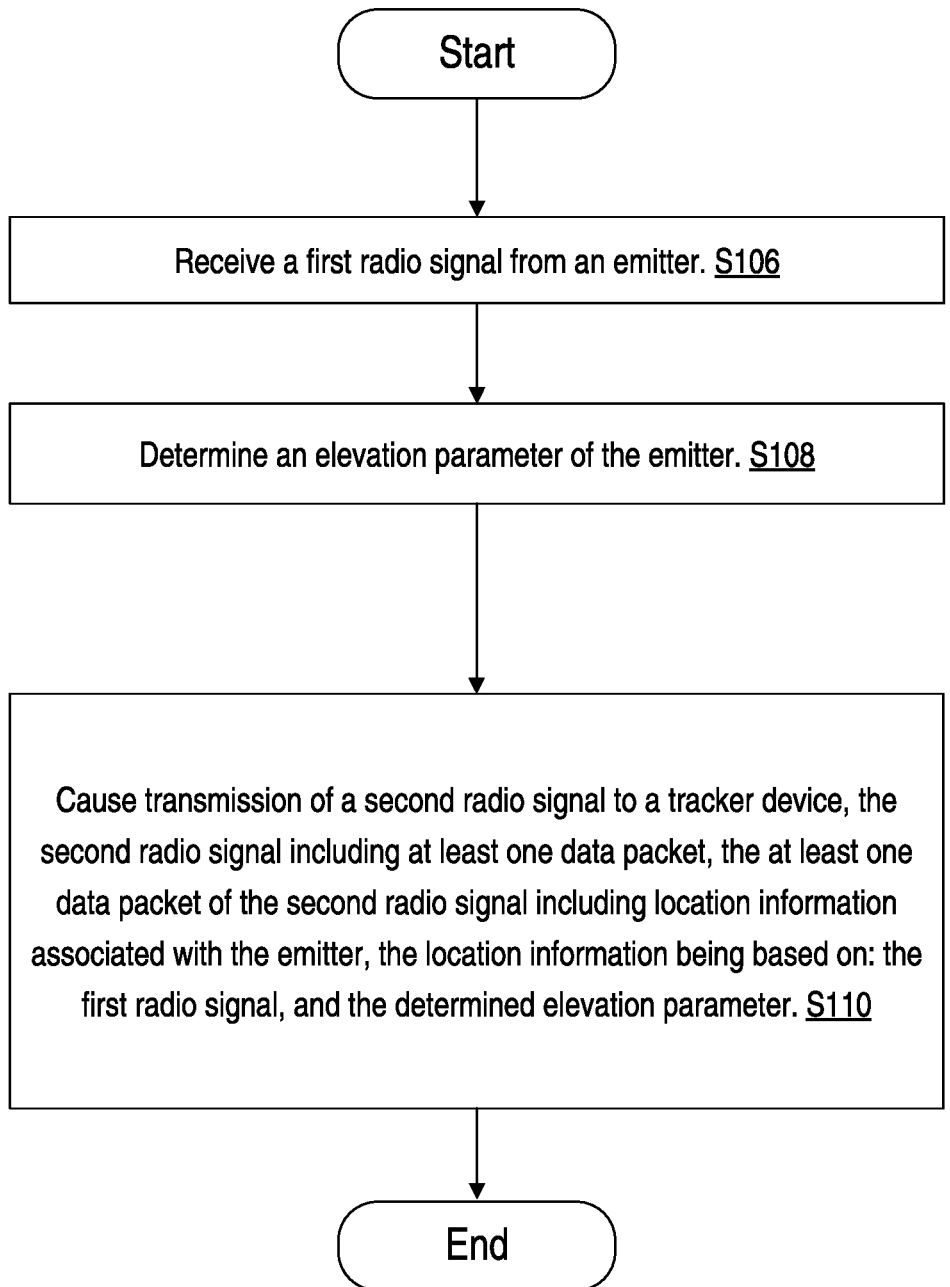
FIG. 6 is a flowchart of an example process in a UAV according to some embodiments of the present invention.

FIG. 6 is a flowchart of an example process in a UAV 12 according to some embodiments of the invention. One or more blocks described herein may be performed by one or more elements of UAV 12, such as by one or more of processing circuitry 60, image sensor 32, light source 30, gas sensor 47, wind sensor 48, rangefinder 50, GPS sensor 52, altitude sensor 54, flight hardware 56, flight controller 64, elevation determiner 65, light controller 66, and/or communication interface 58. UAV 12 is configured to receive (Block S106) a first radio signal 26 from an emitter 14. UAV 12 is configured to determine (Block S108) an elevation parameter of the emitter. UAV 12 is configured to cause transmission (Block S110) of a second radio signal to a tracker 16 including at least one data packet including location information associated with the emitter 14, the location information being based on the first radio signal 24 and the determined elevation parameter.

According to one or more embodiments, UAV 12 is further configured to autonomously adjust a direction of a search light (e.g., light source 30) based on at least one characteristic of the first radio signal 26.

According to one or more embodiments, the elevation parameter is determined based on at least one of an elevation of the UAV 12 and at least one characteristic of the first radio signal 26.

According to one or more embodiments, the determined elevation parameter includes a floor level parameter.

According to one or more embodiments, UAV 12 is further configured to determine the floor level parameter based on at least one of a model of a building 20 in which the emitter 14 is located and an elevation of the UAV 12.

According to one or more embodiments, the first radio signal 26 includes at least one data packet including at least one location parameter associated with the emitter 14.

According to one or more embodiments, the first radio signal 26 includes at least one reference signal.

According to one or more embodiments, the UAV 12 is further configured to cause the UAV 12 to receive a plurality of radio signals from the emitter 14, the plurality of radio signals including the first radio signal 26, the plurality of radio signals being received by the UAV 12 from a plurality of respective locations, each of the plurality of radio signals being associated with a respective signal strength parameter, generate a map based on the plurality of radio signals, the plurality of respective locations, and the respective signal strength parameters, and determine a location of the emitter 14 based on the generated map.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings.

The invention claimed is:

1. A tracker device for a first responder for use in locating a downed first responder in a multi-story building environment, the tracker device comprising:
   a radio configured to:
      receive a first radio signal from an emitter, the emitter worn by or carried on the downed first responder within the multi-story building environment; and
      receive a second radio signal from an unmanned aerial vehicle (UAV) located outside the multi-story building environment, the second radio signal including at least one data packet, the at least one data packet of the second radio signal including location information of the emitter, the location information of the emitter comprises an elevation parameter within the multi-story building environment; and
   processing circuitry in communication with the radio, the processing circuitry configured to:
      determine at least one location parameter associated with the emitter based on the first radio signal and the location information of the at least one data packet of the second radio signal.

2. The tracker device of claim 1, wherein the tracker device further includes a user interface in communication with processing circuitry, the user interface being configured to provide an indication to a user, the indication being based on at least one of:
   a distance to the emitter, the distance being determined based on the at least one location parameter;
   a geographic coordinate of the emitter, the geographic coordinate being determined based on the at least one location parameter; and
   the elevation parameter.

3. The tracker device of claim 1, wherein the processing circuitry is further configured to determine a floor level parameter.

4. The tracker device of claim 3, wherein the processing circuitry is configured to determine the floor level parameter based on at least one of:
   a model of a building in which the emitter is located, and
   the elevation parameter.

5. The tracker device of claim 3, wherein the indication provided to the user includes the floor level parameter.

6. The tracker device of claim 1, wherein the first radio signal includes at least one data packet, the at least one data packet of the first radio signal including at least one location parameter associated with the emitter.

7. The tracker device of claim 1, wherein the first radio signal includes at least one reference signal.

8. A system, comprising:
   the tracker device of claim 1;
   an emitter worn by or carried on the downed first responder within a building environment;
   a UAV configured to operate outside of the building environment and broadcast a second radio signal including at least one data packet, the at least one data packet of the second radio signal including location information of the emitter, the location information of the emitter comprises the emitter's elevation and geographic coordinate within the multi-story building environment.

9. A method implemented in a tracker device for a first responder for use in locating a downed first responder in a multi-story building environment, the tracker device including a radio and processing circuitry in communication with the radio, the method comprising:

receiving a first radio signal from an emitter, the emitter worn by or carried on the downed first responder within the multi-story building environment;

receiving a second radio signal from an unmanned aerial vehicle (UAV) located outside or around the multi-story building environment, the second radio signal including at least one data packet, the at least one data packet of the second radio signal including location information of the emitter, the location information of the emitter comprises an elevation parameter of the emitter;

determining at least one location parameter associated with the emitter based on the first radio signal and the location information of the at least one data packet of the second radio signal.

10. The method of claim 9, the method further comprising:

providing an indication to a user, the indication being based on at least one of:

a distance to the emitter, the distance being determined based on the at least one location parameter;

a geographic coordinate of the emitter, the geographic coordinate being determined based on the at least one location parameter; and the elevation parameter.

11. The method of claim 9, further comprising: determining a floor level parameter.

12. The method of claim 11, wherein the determining of the floor level parameter is based on at least one of:

a model of a building in which the emitter is located, and the elevation parameter.

13. The method of claim 11, wherein the indication provided to the user includes the floor level parameter.

14. The method of claim 9, wherein the first radio signal includes at least one data packet, the at least one data packet of the first radio signal including at least one location parameter associated with the emitter.

15. The method of claim 9, wherein the first radio signal includes at least one reference signal.

* * * * *